Feb. 18, 1958  B. A. ROSS  2,823,882
VIBRATION DAMPER
Filed Dec. 30, 1953  2 Sheets-Sheet 1
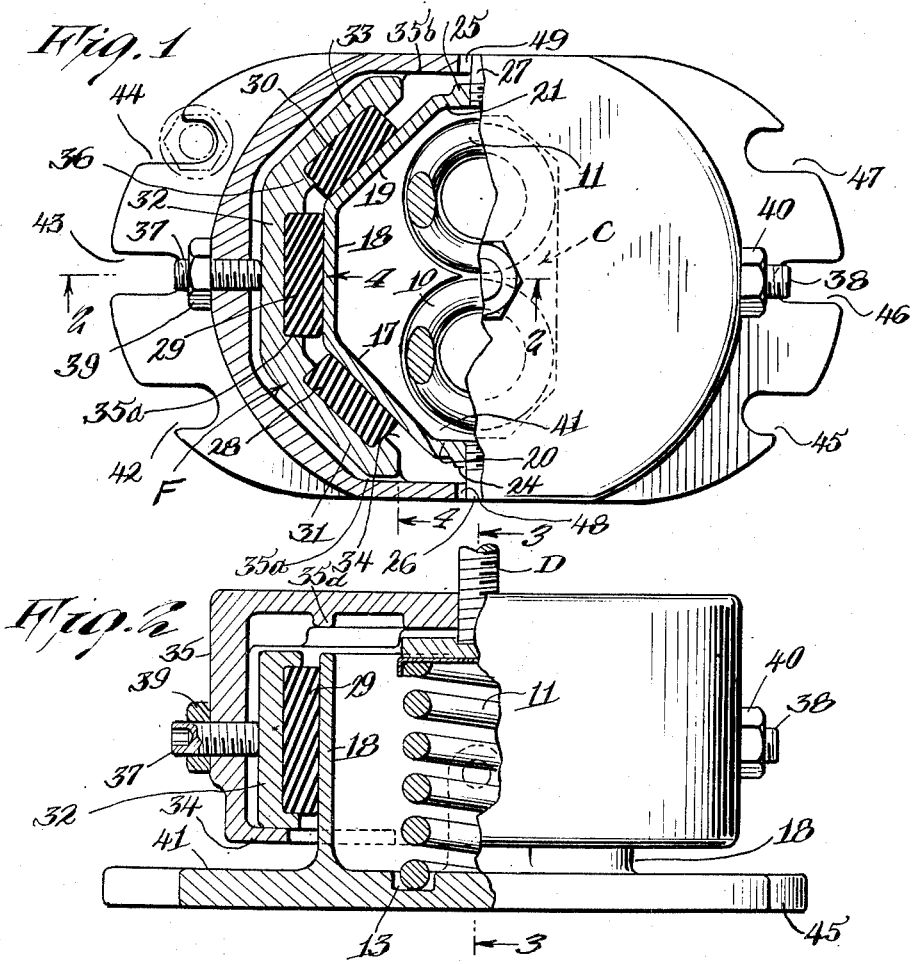
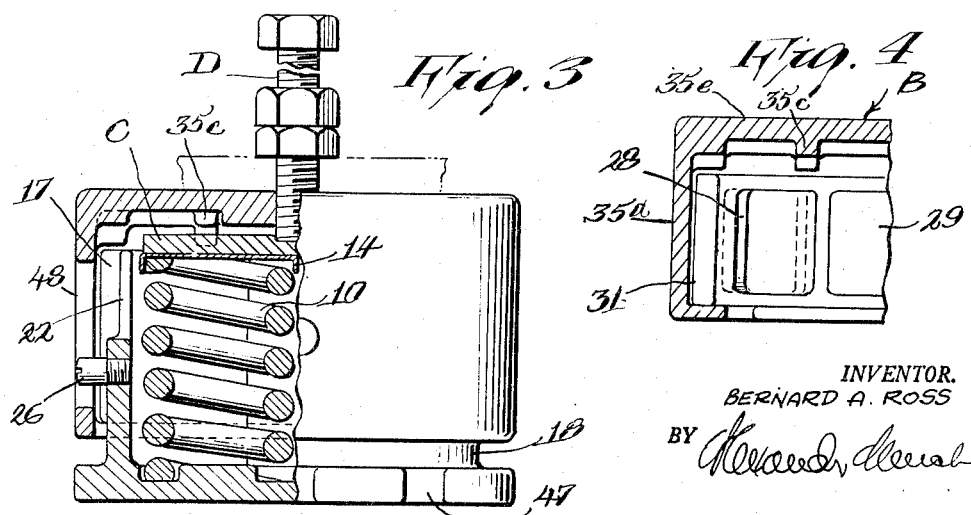
INVENTOR.
BERNARD A. ROSS
BY
ATTORNEY

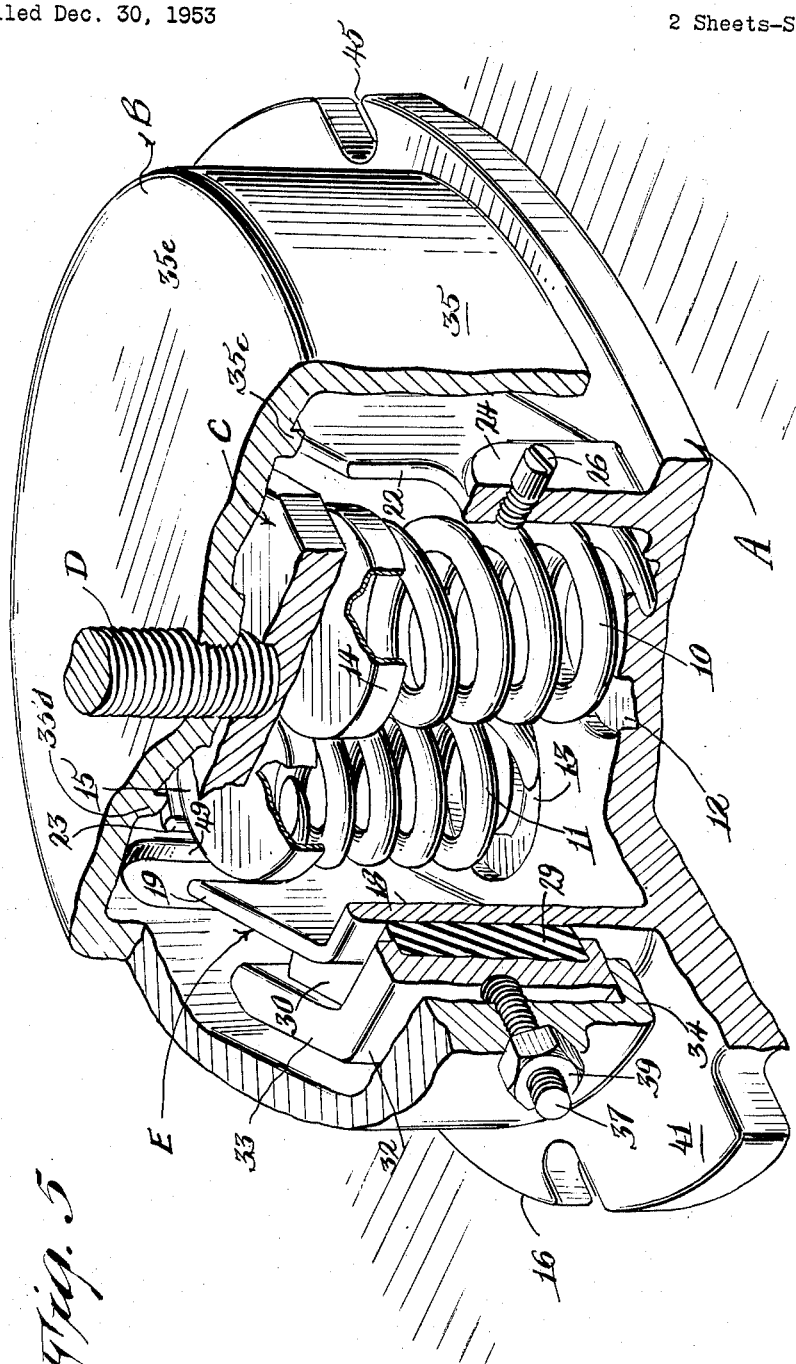

_United States Patent Office_

2,823,882
Patented Feb. 18, 1958

2,823,882

VIBRATION DAMPER

Bernard A. Ross, Flushing, N. Y.

Application December 30, 1953, Serial No. 401,191

2 Claims. (Cl. 248—21)

This invention relates generally to isolators or vibration dampers adapted to be used between the base of various types of machinery and a support such as a floor or sub-base to prevent transmission of vibrations from the machine through the floor or vice versa.

A primary object of the invention is to provide a novel combined structure which supplements the absorption of vibration in a vertical direction by resisting oblique shocks in various directions and angular shocks along a horizontal plane to prevent horizontal planar and other movements between the supported machine and the floor or base represented as the support.

The structure resisting off vertically-directed shocks and along the horizontal plane has distinctive novel features residing in means for selective placement and adjustment of the isolation means which resists not only oblique and side-wise movements of the damper supporting member but other angular movements on the horizontal plane when said means are under compression, the extent of compression being adjustable and operated by a simple means without the necessity of dismantling the entire structure.

Another object of the invention is to provide a simple and practical means for selecting the positioning of the isolation elements whereby the direction of shock resistance obliquely and along the horizontal plane is controlled.

Another feature of the invention resides in the provision of isolation elements mounted in and movable with a guided compression plate adjustable by a single control means and sunpported by the upper top member of the vibration damper.

Other objects of the invention reside in the combined provision of isolation elements mounted in and carried by the compression plate which is guided on a support, the isolation elements being protected against contamination.

These objects and other incidental ends and advantages of the invention will hereinafter appear in the progress of the disclosure and as pointed out in the appended claims.

Accompanying this description are drawings showing a preferred embodiment of the invention wherein:

Fig. 1 is a top plan view partly cut away and in section of the vibration damper.

Fig. 2 is a sectional view of Fig. 1 across the plane 2—2 thereof, part of the view being shown in elevation.

Fig. 3 is a sectional view of Fig. 2 across the plane 3—3 thereof, part of the view being shown in elevation.

Fig. 4 is a partial sectional view of Fig. 1 taken across the plane 4—4 thereof.

Fig. 5 is an enlarged view in perspective showing the device partly cut away and partly in section.

According to the embodiment of the invention illustrated, the vibration damper includes a bottom member generally indicated by letter A and a top member generally indicated by letter B, said members being vertically spaced apart by one or more springs such as coil springs 10 and 11 each having lower ends thereof resting in ring depressions 12 and 13 respectively of bottom member A, while the upper ends of the springs are engaged by a compression yoke plate C having a series of cups 14 and 15 for receiving the upper ends of the springs.

Plate C is adjustable relative to the bottom or base member A by a threaded bolt D which forms a part of the means for anchoring the machinery base to the top member B. This arrangement is more or less conventional depending upon requirements.

Referring now to the novel features of the present invention, it is seen that the bottom member A is provided with a continuous abutment wall generally indicated by letter E. Wall E is centrally disposed of bottom member A, the latter having a non-angular periphery such as wall 16 to prevent the effects of colliding interference.

Abutment wall E is continuous and may be circular, curvilinear or polygonal, but as shown is hexagonal and consists of three consecutive operative faces on each side, the faces of one side being indicated by numerals 17, 18 and 19, the opposite corresponding faces being similar but not shown. The opposite faces of abutment wall E along the transverse axis are indicated by numerals 20 and 21 and are provided with cut-outs 22 and 23 respectively extending intermediate the height of the faces to the top edge. Faces 20 and 21 below the cut-outs 22 and 23 are each provided with an external lug 24 and 25 respectively each bearing a threaded pin such as 26 and 27 for purposes of preventing total disengagement of the top member B from the bottom member as will hereinafter appear.

The isolation elements adapted to be compressed against the faces of each side of the abutment wall on one side are indicated by numerals 28, 29 and 30, the corresponding isolation elements on the opposite side not being shown. Thus isolation elements 28, 29, and 30 are adapted to be compressed against the abutment faces 17, 18 and 19 as shown in Figure 1, while the corresponding isolation elements on the opposite side are adapted to be compressed against the corresponding abutment faces not shown.

Abutment wall E at each of the opposite sides of the longitudinal axis thereof cooperates with similar, corresponding multi-planar compression plates, one of such plates being shown and indicated by letter F. Thus, faces 31, 32 and 33 thereof forms a polygonal section and is adapted to cooperate with faces 17, 18 and 19 respectively of abutment wall E.

Each of the movable and adjustable compression plates F is adapted to move along and be supported respectively on an inwardly extending bottom flange 34 proceeding from the peripheral and internally webbed side wall 35 of the top member B and is guided against substantial angular movement by slight clearance with respect to portions of the side wall 35 as at 35a and 35b as seen in Figure 1. Each of the compression plates F is prevented or stopped from excessive vertical displacement by ridges 35c and 35d depending from the underside of top plate 35e.

Each face of the compression plates is provided with a recess on the inner wall for mounting therein of each of the isolation blocks. Thus, the blocks are elevated, guided and capable of engaging the smooth outer side walls of the respective sections of the abutment wall as best shown in Figures 1 and 5. The recesses for blocks 28, 29 and 30 in compression plate faces 31, 32 and 33 are indicated by numerals 34, 35 and 36.

Each compression plate is abutted by the end of a threaded stud such as 37 and 38 each of which pass through the peripheral wall at opposite sides of the top member B. The outer ends of each of the studs beyond wall 35 have a lock nut such as 39 and 40 whereby adjustment of the plates F to control compression of the isolation blocks against the abutment wall E may be locked.

It is to be noted the isolation block extends above the base 41 of the lower member A and is not vertically displaceable but moves in a horizontal planar direction in conformity with the movement of the compression plates F controlled by walls 35a and 35b. Moreover, the isolation blocks abut the outer surfaces of the abutment wall faces and intermediate the height thereof; thereby providing sufficient space to enable the spring elements 10 and 11 to function effectively as the bottom member A and the top member B move relative to each other under vibrations.

In the arrangement described, it will be apparent that the set of isolation blocks such as set 28, 29 and 30 are made to move toward the corresponding faces of the abutment plate E by manipulating the studs 37 and 38 and the positions fixed by adjustment of the nuts 39 and 40 or any other type of locking arrangement. By turning studs 37 and 38 the compression plates F are displaced toward the abutment member thereby placing the isolation blocks under more or less compression causing them to spread against the outer walls of the abutment plate faces. Depending on the degree of tension placed on the studs 37 and 38, the isolation blocks may be soft or hard to suit varying degrees of fatigue in the blocks and to suit other conditions in different installations. Moreover, it will be readily apparent that since the stud combinations 37 and 38 are readily accessible at the ends of the unit, adjustment is easily effected.

The arrangement of the isolation blocks relative to the entire assembly effectively resists thrusts at any angle along the horizontal plane and at oblique angles to the vertical while permitting the springs 10 and 11 to function in a normal manner.

Although the abutment and the compression plates are polygonal in configuration whereby thrusts are absorbed at angles to the vertical and at angular positions in the horizontal plane, such shapes may be curvilinear segments in configuration since as is well known a polygon is nothing but a curvature of an infinite number of sides.

It is to be noted that the base 41 of the lower member A is provided with a series of notches such as 42, 43 and 44, and 45, 46 and 47 respectively at each end of the longitudinal axis for selective affixation of the base member to a support or base.

The end walls of the top member B are rounded in shape and give the top member the form of a dome. The side wall 35 at opposite ends of the transverse axis and intermediate the height thereof is provided with windows 48 and 49 whereby the inner structure is accessible and viewable therethrough to see the degree of compression of springs 10 and 11. Moreover through these windows can be seen the studs 26 and 27 which serve to act as a stop for the removal of the top member in conjunction with the bottom portions of windows 48 and 49 when the occasion demands or where there are conditions of undue thrust on top member B. Moreover the studs 26 and 27 are removable through the windows when it is required to dismantle top B from bottom A.

The structure as shown provides a vibration damper which is substantially entirely closed and wherein the isolation elements are carried and mounted in adjustable compression plates supported and guided by the side and top walls of the top member as has been heretofore described.

Moreover, by virtue of the cooperating shapes of the compression plates and the abutment wall, a selection of the number and location of the isolating elements is capable of being made and the direction or combination of directions of thrust is under control. Thus, by suitable adjustment of the studs 37 and 38, the isolation blocks are loosened or tightened by a single manipulation in two directions, and the snubbing elements therefore are made to control the direction of snubbing. And as has been described, the linear movement of the compression plates are also under control.

It is understood that the invention is not necessarily limited to a combination with spring members for vertical resistance such as 10 and 11 since any other type of resilient material may be used therefor. As an incidental feature, the isolating block members are protected against cutting by virtue of the mounting thereof and pressure against smooth surfaces, and are further protected from contamination by reason of the positioning thereof.

I wish it understood that minor changes and variations in the size, location, integration, material and combination of parts may all be resorted to without departing from the spirit of the invention and the scope of the appended claims.

I claim:

1. A vibration damper comprising a bottom fixed member having a vertically extending integral, and peripheral multi-faced abutment wall, the faces thereof being in angular relationship in excess of 90 degrees, a top load supporting member fitting over said bottom member and having a peripheral side wall extending downward in spaced relation to said abutment wall, internal means between said top and bottom members for resiliently supporting the load supporting member, said peripheral side wall having opposite inwardly directed flanges at the bottom edge, a pair of compression plates each movably supported on one of said flanges and each having recessed faces parallel with and opposing the respective faces of the abutment wall, blocks of resilient vibration damping material each mounted in each of the plate recessed faces of the compression plates, and means mounted in the side wall opposite each compression plate to adjustably compress the said blocks thereon against the corresponding abutment wall faces for damping action.

2. A vibration damper as set forth in claim 1 wherein means are provided to guide the movement of the compression plates, said means being disposed in the top load supporting member.

References Cited in the file of this patent

UNITED STATES PATENTS

| | | |
|---|---|---|
| 1,734,596 | Rosenzweig | Nov. 5, 1929 |
| 1,951,020 | Hoevel | Mar. 13, 1934 |
| 2,259,049 | Swan et al. | Oct. 14, 1941 |
| 2,359,941 | Rosenzweig | Oct. 10, 1944 |
| 2,466,480 | Rosenzweig | Apr. 5, 1949 |

FOREIGN PATENTS

| | | |
|---|---|---|
| 25,436 | Great Britain | of 1912 |